US012167367B2

(12) United States Patent
Ali et al.

(10) Patent No.: US 12,167,367 B2
(45) Date of Patent: Dec. 10, 2024

(54) RESOURCE ALLOCATION AND CONFIGURATION FOR BROADCAST AND UNICAST OPERATION OVER SIDELINK FOR NR V2X

(71) Applicant: Apple Inc., Cupertino, CA (US)

(72) Inventors: Ansab Ali, Hillsboro, OR (US); Keyongin Jeong, Portland, OR (US); Sangeetha L. Bangolae, Houston, TX (US); Youn Hyoung Heo, Seoul (KR)

(73) Assignee: Apple Inc., Cupertino, CA (US)

( * ) Notice: Subject to any disclaimer, the term of this patent is extended or adjusted under 35 U.S.C. 154(b) by 644 days.

(21) Appl. No.: 17/250,919

(22) PCT Filed: Sep. 27, 2019

(86) PCT No.: PCT/US2019/053422
§ 371 (c)(1),
(2) Date: Mar. 26, 2021

(87) PCT Pub. No.: WO2020/069295
PCT Pub. Date: Apr. 2, 2020

(65) Prior Publication Data
US 2021/0400633 A1    Dec. 23, 2021

Related U.S. Application Data

(60) Provisional application No. 62/737,731, filed on Sep. 27, 2018.

(51) Int. Cl.
*H04W 72/02*    (2009.01)
*H04W 4/40*    (2018.01)
*H04W 72/30*    (2023.01)

(52) U.S. Cl.
CPC ............ *H04W 72/02* (2013.01); *H04W 4/40* (2018.02); *H04W 72/30* (2023.01)

(58) Field of Classification Search
CPC ..... H04W 72/04; H04W 72/02; H04W 76/02; H04W 72/00; H04W 4/40; H04W 4/06;
(Continued)

(56) References Cited

U.S. PATENT DOCUMENTS

2017/0041902 A1    2/2017 Sheng
2017/0188391 A1*   6/2017 Rajagopal et al. ..........................
                                                H04W 74/0816
(Continued)

FOREIGN PATENT DOCUMENTS

CN    107431586 A    12/2017
WO    2016/171748    10/2016
WO    WO 2019/036578 A1 *  2/2019  .............. H04W 4/02

OTHER PUBLICATIONS

WO 2018157611 A1; Xu et al.: Method and Device for Configuring Radio Resource, and Storage Medium (see title). (Year: 2018).*
(Continued)

*Primary Examiner* — Meless N Zewdu
(74) *Attorney, Agent, or Firm* — Fay Kaplun & Marcin, LLP

(57) ABSTRACT

An apparatus of a user equipment (UE) comprises one or more baseband processors to configure a set of resources for New Radio (NR) vehicle-to-everything (V2X) transmission over sidelink for communication with one or more other UEs, and to allocate the resources for transmitting one or more packets from an NR network to the one or more other UEs via the sidelink. The apparatus can include a memory to store the configuration of resources.

10 Claims, 4 Drawing Sheets

(58) Field of Classification Search
CPC ..... H04W 92/18; H04W 72/30; H04W 72/40; H04W 72/25; H04W 72/20; H04W 72/121; H04W 72/0446; H04W 72/0453; H04W 72/0457; H04W 72/044; H04W 52/383; H04W 4/46; H04W 4/50; H04W 4/70; H04W 4/02; H04W 4/08; H04W 36/0007; H04W 48/10; H04W 76/40; H04W 76/00; H04W 76/11; H04W 92/00; H04W 92/04; H04W 4/30; H04W 4/44

See application file for complete search history.

(56) References Cited

U.S. PATENT DOCUMENTS

| | | | | |
|---|---|---|---|---|
| 2018/0279275 | A1* | 9/2018 | Chen et al. | H04W 72/042 |
| 2019/0045529 | A1* | 2/2019 | Xiong et al. | H04W 72/1284 |
| 2019/0075548 | A1* | 3/2019 | Lee et al. | H04W 72/02 |
| 2019/0349952 | A1* | 11/2019 | Uchiyama | H04W 72/10 |
| 2020/0008025 | A1* | 1/2020 | Lee et al. | H04W 4/40 |

OTHER PUBLICATIONS

Zhao, Qun: (CN 109076561 A), Resource Configuration Method And Device (see title) (Year: 2018).*

CN 112514424 A; Lin et al.: User Equipment And Method For Communication Of New Wireless Vehicle-to-equipment Thereof (see title) (Year: 2021).*

(JP 2019531006 A) >>> System And Method For Resource Sensing For Side Link Operation (see title) (Year: 2019).*

(CN 110892765 A) >>> Method And Apparatus For Performing Side Link Transmission On Multiple Carriers In A Wireless Communication System (see title) (Year: 2020).*

(CN 110999444 A) >>> Device For Method Of Selecting Carrier And Supporting The Method (see title) (Year: 2020).*

(CN 112425233 A) >>> User Equipment And Communication Method (see title and Description) (Year: 2021).*

(KR 20190055232 A) >>> Method And Apparatus For Transmitting Side Link Channel Congestion Ratio In A Wireless Communication System (see title) (Year: 2019).*

(CN 111132371 A) >>> Secondary Link Connection Establishment And Resource Allocation Method, Terminal And Network Side Device (see title) (Year: 2020).*

Intel, "Offline Summary for NR-V2X Agenda Item—7.2.4.1.4 Resource Allocation Mechanism", R1-1809867, 3GPP TSG RAN WG1, Aug. 2018.

Ericsson, "On Exceptional Pools", R2-1700942, 3GPP TSG-RAN WG2, Feb. 2017.

Panasonic, "Discussion on Supporting Unicast, Groupcast and Broadcast via NR Sidelink", R1-1808646, 3GPP TSG RAN WG1, Aug. 2018.

NTT Docomo, Inc., "Resource Allocation Mechanism", R1-1809159, 3GPP TSG RAN WG1, Aug. 2018.

* cited by examiner

RESOURCE ALLOCATION AND CONFIGURATION FOR BROADCAST AND UNICAST OPERATION OVER SIDELINK FOR NR V2X

CROSS-REFERENCE TO RELATED APPLICATIONS

The present application claims the benefit of U.S. Provisional Application No. 62/737,731 (AB5660-PCT) filed Sep. 27, 2018. Said Application No. 62/737,731 is hereby incorporated herein by reference in its entirety.

BACKGROUND

In order to efficiently address the use case requirements for advanced vehicle-to-many (V2X) use cases for New Radio (NR), the overall system design, specifically the resource allocation and configuration for sidelink for user equipment (UE) devices operating in unicast and broadcast communication modes needs to be defined. To this end, solutions can be provided to define the functionality based on Long Term Evolution (LTE) and consider enhancements for harmonious coexistence of unicast and broadcast traffic over sidelink.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
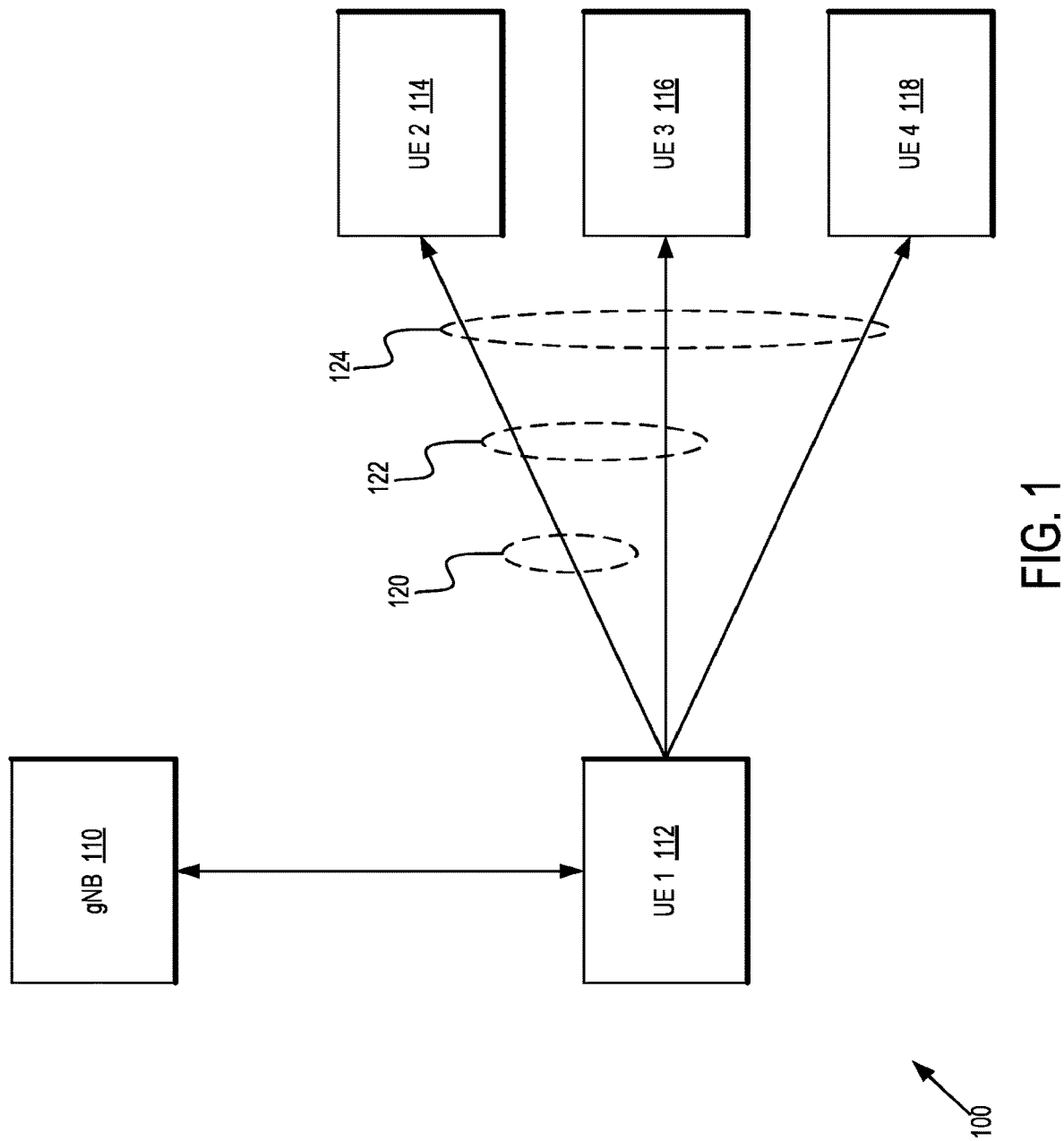
FIG. 1 is a diagram of an uplink grant procedure in which an uplink transmission is lost in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled, however, may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of an uplink grant procedure in which an uplink transmission is lost in accordance with one or more embodiments will be discussed. As New Radio (NR) based vehicle-to-everything (V2X) use cases gain traction, procedures should be defined for efficiently allowing different NR V2X user equipment (UE) devices to be able to perform V2X transmissions, irrespective of their physical status, mobility, and position within the network coverage area. V2X UEs in general can have a very different mobility profile than non-V2X UEs and thus should have a specific configuration and system design to allow seamless V2X connectivity. Since vehicular UEs (V-UEs) are not guaranteed to be in coverage at any given point in time, resources should be allocated for use for the out of coverage scenarios as well. This allocation of resources in the Third Generation Partnership Project (3GPP) Long Term Evolution (LTE) standard can be handled by two operational modes.

A first operational mode comprises network scheduled operation, which is only applicable when under coverage of the evolved NodeB (eNB) and in RRC_CONNECTED mode. The UE requests resources for transmission from the eNB or next generation NodeB (gNB) for NR networks. The eNB or gNB can schedule dedicated resources for transmission based on some relevant information indicated by the UE.

A second operational mode comprises autonomous resource selection operation, where the UE selects a set of resources from specific resource pools for V2X transmission. This applicable for both in coverage and out of coverage scenarios. The selection of resource pools can be based on a number of factors including the geographical position of the UE.

For both network (NW) scheduled and autonomous cases, the transmission was broadcast based wherein no dedicated connection as assumed by the UE when sending the packet over sidelink. With NR V2X and the possibility of supporting both unicast and broadcast based communication, there is an added dimension of complexity involved when considering resource configuration design and procedures for NR V2X. It is expected, however, that the overall design can still revolve around an LTE framework based on broadcast, which is based on supporting the two modes of operation as discussed above. Indeed, NR V2X is expected to have similar modes of operation as LTE, namely network scheduled operation and autonomous resource selection. Considering at least sidelink operation, one way to handle this is to reuse the LTE resource allocation framework. Specifically, as a starting point, the UE can perform sidelink V2X communication for NR if it is under coverage of a suitable serving cell and the selected frequency for V2X communication is allowed to be used or if the UE is authorized to perform V2X communication out of coverage. The authorization using pre-configuration can be based on criteria similar to that involved with LTE. Additionally, radio resource control (RRC) signaling can be used for indicating the UE's interest in V2X communication, similar to the SidelinkUEInformation information element (IE) as in LTE.

In accordance with one or more embodiments, resource pool configuration for autonomous resource selection mode can be utilized. As shown in NR network 100, when the first UE (UE 1) 112 is within range of and connected to next generation NodeB (gNB) 110, the first operational mode, network scheduled operation, can be used. In this mode, first UE 112 is in operational range gNB and in RRC_CONNECTED mode. First UE 112 can request resources for transmission gNB 110, and gNB 110 can schedule dedicated resources for transmission based on some relevant information indicated by first UE 112.

For the case of autonomous resource selection mode, for example when first UE 112 is not within the operational range of gNB 110, the overall configuration for sidelink V2X communication in network 100 can be handled similar to how it is handled in LTE. The set of resources or resource pools UE 112 is allowed to use when in RRC_CONNECTED or RRC_IDLE mode can be included in system information broadcast by the cell or provided via dedicated signaling, such as RRC signaling, as applicable. This can also include the set of exception pools and associated configuration. In LTE, exception transmission (TX) pools were designed to be used for specific scenarios where UE 112 cannot use the normal TX pools, for example handover, radio link failure, transition from RRC_IDLE to RRC_CONNECTED, and so on, and involves resources for urgent transmission. In this case, UE 112 may select resources in an exceptions pool for V2X transmission. For instance, in case of handover, the exception pool configuration can be included in the handover command, and UE 112 can use the configuration to perform V2X transmission in the interim. Similarly, for radio link failure (RLF), UE 112 can use an exception pool from configuration provided in system information temporarily. For NR network 100, depending on the mobility of the individual V-UEs, reusing the same functionality can be useful. While the use of exception TX resource pool may cause resource segmentation and inefficient operation, the advantages of using it can outweigh the demerits.

Since the operation for LTE is broadcast based, the usage of such a resource pool can also dependent on the congestion status as well as the priority of the traffic to be sent. In LTE, this was based on channel busy ratio (CBR) and transmission parameters mapping to individual pools such that UE 112 chooses resources and TX parameters based on the priority of traffic. For NR network 100, it can be assumed that a similar metric can be defined to handle the resource usage by broadcast traffic, so the same principle applies. In this case, the system information can include the configuration when UE 112 can use the resource pools based on the current resource utilization measured by UE 112. The overall sensing based usage is essential to allow for efficient usage of shared resources and should be used in NR V2X, at least to support broadcast operation.

In one or more embodiments, resource configuration for unicast operation can be utilized. In one example, first UE 112 can communicate with second UE (UE 2) 114 via a unicast link 120. In another example, first UE 112 can communicate second UE 114 and a third UE (UE 3) 116 via a groupcast link 122 wherein UE 2 and UE 3 comprise a defined group of UEs. In a further example, first UE 112 can communicate with all UEs in the vicinity comprising UE 2, UE 3, and a fourth UE (UE 4) 118 as an example, via a broadcast link 124. Since the fundamental difference between broadcast and unicast and/or groupcast transmissions is based on whether they are addressed for a specific UE or a set of UEs, which have been determined previously during the connection establishment procedure, this gives rise to the question whether the physical resources utilized for V2X transmissions are dedicated or shared with those used for broadcast transmissions, specifically for the autonomous resource allocation mode. With the advanced use cases and stringent requirements for NR V2X, unicast transmissions can be used specifically for high reliability and low latency cases, for example extended sensor sharing or remote driving. In such cases, transmissions from UEs for these use cases and/or V2X services can be afforded an appropriate set of resources and Quality of Services (QoS) involved for proper operation. From this perspective, a suitable set of sidelink resources can be allocated in order to meet the stringent QoS requirements for advanced V2X use cases.

In this regard, for NR V2X, partitioning of resources and associated configuration based on mode of operation, unicast, groupcast versus broadcast, can be considered. For operational mode two as discussed above directed to the autonomous resource selection case, since it is expected that the need for a V2X application to establish a unicast link is independent of its mode of operation, operational mode one or operational mode two. Based on this assumption, separate, non-overlapped resources can be allocated for unicast transmissions. Even with various sidelink enhancements being considered to target the unicast case, hybrid automatic repeat request (HARQ) feedback, radio link control (RLC) acknowledged mode (AM), and so on, the underlying set of physical resources itself goes a long way in determining if QoS requirements can be met. So at least for unicast operation, dedicated resource pools for V2X communication over sidelink can be considered, which can ensure reduced contention with broadcast traffic as well as enhanced resource efficiency from a system perspective. The same mechanism, in general, can be extended to groupcast case as well.

In terms of configuration, these resource pools can be included separately, either in the system information or pre-configured to the NR UEs and mapped to specific V2X services or service types. In this way, any given UE after establishing a unicast connection can use the specific resource pool assigned to the relevant V2X service or service type. The overall sensing based transmission procedure is still needed, since this is not a true dedicated set of resource. Rather, resource pooling can offer better performance than sharing transmissions with other broadcast traffic. The detailed operation of such resource pooling can be as follows.

In one or more embodiments, two options on how to configure the resource pools for V2X unicast, groupcast, and broadcast communication can be provided, along with a third, combined option.

The first option comprises configuring the resource pools which are used for any group-cast and broadcast and the resource pools which is used for any unicast separately, regardless of the pair of unicast, for example the resource pools configured for unicast can be used both for unicast pair #1 comprising of source identifier (ID) (A) and destination ID (B), and unicast pair #2 comprising source ID (A) and destination ID (C). In that case, the transmitter UE, for example first UE 112, can select the resource pool configured for groupcast and broadcast if any groupcast or broadcast communication is triggered and operational mode two comprising UE autonomous resource selection is used. Similarly, the transmitter UE will select the resource pool configured for unicast if any unicast is triggered and operational mode two is used. On the other side of things, the receiver UE, for example second UE 114, can monitor the resource pool configured for unicast if unicast connection is established. Note that the control message for unicast establishment can be transmitted and/or received over the resource pool configured for groupcast and broadcast.

In order to avoid collision in the resource selection within the resource pool or congestion among the resource pools, the resource selection within the resource pool or the resource pool selection when multiple resource pools are configured can be also done based on the certain function. One example can be to utilize a hash-function by using the source ID and/or destination ID to distribute the selected resource or resource pools to multiple transmitter UEs. Note that a receiver UE can monitor only the corresponding resource or resource pool as the result of the hash function for the unicast session which has been already established.

The second option comprises configuring resource polls which are used for any groupcast and broadcast and the resource pool or pools which are used for a specific unicast pair. In this case, extending the above example, the resource pool or pools for the unicast pair #1 comprising a source ID (A) and destination ID (B) and the resource pool or pools for the unicast pair #2 comprising source ID (A) and destination ID (C) can be separately configured. The transmitter UE, for example first UE 112, can select the resource pool configured for group-cast and broadcast if any groupcast or broadcast is triggered and mode two comprising UE autonomous resource selection is used. Similarly, the transmitter UE (UE 1) can select the resource pool configured for the associated unicast link if unicast is triggered and mode two is used, for example if the unicast pair #1 is triggered, the resource pool configured with the association to the unicast pair #1 is used. A receiver UE, for example second UE 114, can monitor the resource pool configured for the associated unicast if this unicast pair has been established.

Such a configuration is more akin to dedicated configuration rather than configuration via system information. In this case, the network 100 should know the unicast pair information and the UE can inform the NW 100 via either an RRC message or as part of media access control (MAC) header/control information element. In some embodiments, the network 100 can activate and/or deactivate the candidate resource pool more dynamically depending on the amount of data the UE has to transmit and the active pair of unicast, that is which unicast pair needs to transmit. For this activation/deactivation, network 100 can command either via MAC header or MAC Control information Element (CE) or physical control information and to avoid multiple commands to both transmitter UE and receiver UE for that unicast, the network 100 may assign the pair id to both UEs. If a transmitter UE receives activation command by using this pair id, the UE considers the resource pool associated with that unicast pair as activated and uses it for transmission associated with that unicast pair. If a receiver UE receives activation command by using this pair ID, the UE will monitor any data reception over that resource pool. With the same principle, if a transmitter UE receives deactivation command by using this pair ID, the UE will consider that resource pool as deactivated and it will not be used. If a receive UE receives deactivation command by using this pair ID, the UE will stop monitoring that resource pool.

In one or embodiments, a combination of the first option and the second option can be utilized. For example, the first option can be used in the configuration via system information and the second option can be used in the configuration via the dedicated RRC configuration.

In one or more embodiments, the congestion control mechanism can be used specifically for unicast transmissions. In LTE, as discussed above, V2X congestion control over sidelink resource pools is based on a channel busy ratio (CBR) and Proximity Services (ProSe) per-packet priority (PPPP) mapping to ensure that high priority traffic takes precedence when congested resources are an issue. For NR V2X, considering both unicast and broadcast, regardless of whether separate non-overlapped resources are allocated for autonomous resource selection operation, it can be considered whether unicast traffic should be subject to the same priority rules as broadcast traffic. One reason why a V2X application at a given UE would set up a unicast connection is to meet specific QoS requirements it is not expected or able to otherwise meet using broadcast operation. From that sense, unicast traffic inherently corresponds to higher overall priority than broadcast traffic. It should be noted that priority here does not refer to any specific QoS parameter but the general need for this traffic to be dealt with a higher urgency compared with broadcast traffic. The QoS parameters for NR V2X are expected to be different from LTE, but the basic principle can still be that based on these parameters in general, the usage of the resources can be regulated. So, the corresponding set of rules such as CBR-PPPP like mapping for unicast traffic in general can be configured differently from broadcast traffic. This configuration can be done by adding separate configuration for unicast versus broadcast based transmissions in the system information or pre-configuration for NR V-UEs.

Figure 2:
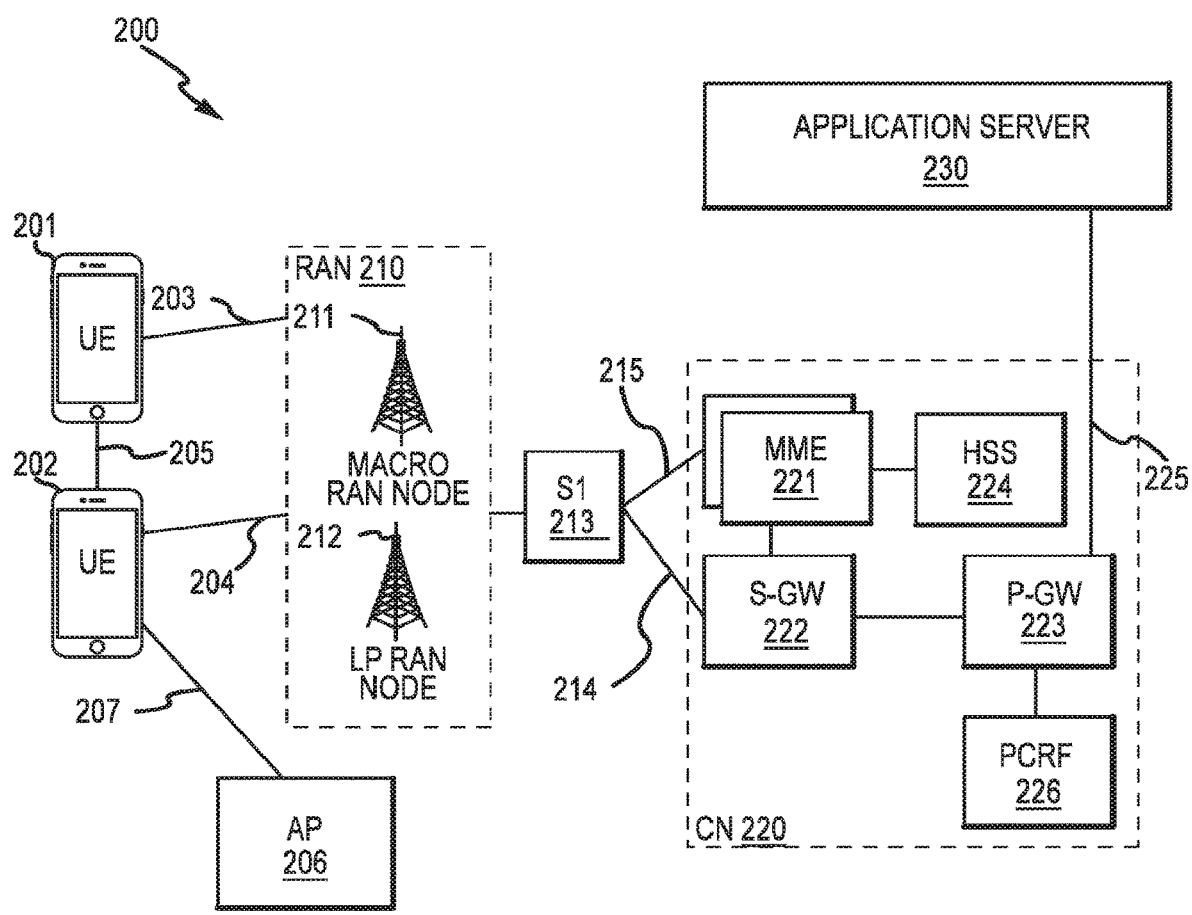
FIG. 2 illustrates an architecture of a system of a network in accordance with some embodiments.

FIG. 2 illustrates an architecture of a system 200 of a network in accordance with some embodiments. The system 200 is shown to include a user equipment (UE) 201 and a UE 202. The UEs 201 and 202 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 201 and 202 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 201 and 202 may be configured to connect, e.g., communicatively couple, with a radio access network (RAN) 210—the RAN 210 may be, for example, an Evolved Universal Mobile Telecommunications System (UMTS) Terrestrial Radio Access Network (E-UTRAN), a NextGen RAN (NG RAN), or some other type of RAN. The UEs 201 and 202 utilize connections 203 and 204, respectively, each of which comprises a physical communications interface or layer (discussed in further detail below); in this example, the connections 203 and 204 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 201 and 202 may further directly exchange communication data via a ProSe interface 205. The ProSe interface 205 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 202 is shown to be configured to access an access point (AP) 206 via connection 207. The connection 207 can comprise a local wireless connection, such as a connection consistent with any IEEE 802.11 protocol, wherein the AP 206 would comprise a wireless fidelity (WiFi®) router. In this example, the AP 206 is shown to be connected to the Internet without connecting to the core network of the wireless system (described in further detail below).

The RAN 210 can include one or more access nodes that enable the connections 203 and 204. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 210 may include one or more RAN nodes for providing macrocells, e.g., macro RAN node 211, and one or more RAN nodes for providing femtocells or picocells (e.g., cells having smaller coverage areas, smaller user capacity, or higher bandwidth compared to macrocells), e.g., low power (LP) RAN node 212.

Any of the RAN nodes 211 and 212 can terminate the air interface protocol and can be the first point of contact for the UEs 201 and 202. In some embodiments, any of the RAN nodes 211 and 212 can fulfill various logical functions for the RAN 210 including, but not limited to, radio network controller (RNC) functions such as radio bearer management, uplink and downlink dynamic radio resource management and data packet scheduling, and mobility management.

In accordance with some embodiments, the UEs 201 and 202 can be configured to communicate using Orthogonal Frequency-Division Multiplexing (OFDM) communication signals with each other or with any of the RAN nodes 211 and 212 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 211 and 212 to the UEs 201 and 202, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 201 and 202. The physical downlink control channel (PDCCH) may carry information about the transport format and resource allocations related to the PDSCH channel, among other things. It may also inform the UEs 201 and 202 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 211 and 212 based on channel quality information fed back from any of the UEs 201 and 202. The downlink resource assignment information may be sent on the PDCCH used for (e.g., assigned to) each of the UEs 201 and 202.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 210 is shown to be communicatively coupled to a core network (CN) 220—via an S1 interface 213. In embodiments, the CN 220 may be an evolved packet core (EPC) network, a NextGen Packet Core (NPC) network, or some other type of CN. In this embodiment the S1 interface 213 is split into two parts: the S1-U interface 214, which carries traffic data between the RAN nodes 211 and 212 and the serving gateway (S-GW) 222, and the S1-mobility management entity (MME) interface 215, which is a signaling interface between the RAN nodes 211 and 212 and MMEs 221.

In this embodiment, the CN 220 comprises the MMEs 221, the S-GW 222, the Packet Data Network (PDN) Gateway (P-GW) 223, and a home subscriber server (HSS) 224. The MMEs 221 may be similar in function to the control plane of legacy Serving General Packet Radio Service (GPRS) Support Nodes (SGSN). The MMEs 221 may manage mobility aspects in access such as gateway selection and tracking area list management. The HSS 224 may comprise a database for network users, including subscription-related information to support the network entities' handling of communication sessions. The CN 220 may comprise one or several HSSs 224, depending on the number of mobile subscribers, on the capacity of the equipment, on the organization of the network, etc. For example, the HSS 224 can provide support for routing/roaming, authentication, authorization, naming/addressing resolution, location dependencies, etc.

The S-GW 222 may terminate the S1 interface 213 towards the RAN 210, and routes data packets between the RAN 210 and the CN 220. In addition, the S-GW 222 may be a local mobility anchor point for inter-RAN node handovers and also may provide an anchor for inter-3GPP mobility. Other responsibilities may include lawful intercept, charging, and some policy enforcement.

The P-GW 223 may terminate an SGi interface toward a PDN. The P-GW 223 may route data packets between the EPC network 223 and external networks such as a network including the application server 230 (alternatively referred to as application function (AF)) via an Internet Protocol (IP) interface 225. Generally, the application server 230 may be an element offering applications that use IP bearer resources with the core network (e.g., UMTS Packet Services (PS) domain, LTE PS data services, etc.). In this embodiment, the P-GW 223 is shown to be communicatively coupled to an application server 230 via an IP communications interface 225. The application server 230 can also be configured to support one or more communication services (e.g., Voice-over-Internet Protocol (VoIP) sessions, PTT sessions, group communication sessions, social networking services, etc.) for the UEs 201 and 202 via the CN 220.

The P-GW 223 may further be a node for policy enforcement and charging data collection. Policy and Charging Enforcement Function (PCRF) 226 is the policy and charging control element of the CN 220. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 226 may be communicatively coupled to the application server 230 via the P-GW 223. The application server 230 may signal the PCRF 226 to indicate a new service flow and select the appropriate Quality of Service (QoS) and charging parameters. The PCRF 226 may provision this rule into a Policy and Charging Enforcement Function (PCEF) (not shown) with the appropriate traffic flow template (TFT) and QoS class of identifier (QCI), which commences the QoS and charging as specified by the application server 230.

Figure 3:
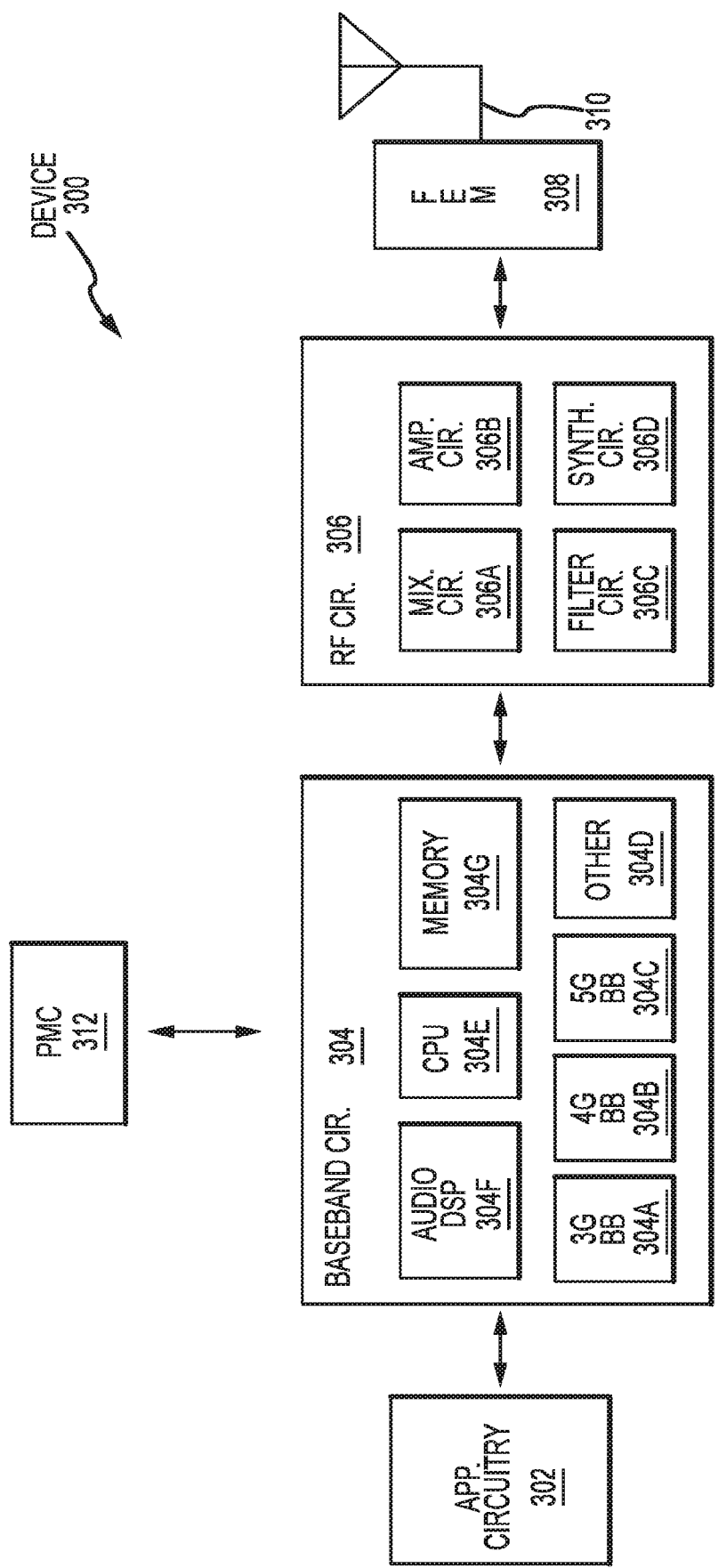
FIG. 3 illustrates example components of a device in accordance with some embodiments.

FIG. 3 illustrates example components of a device 300 in accordance with some embodiments. In some embodiments, the device 300 may include application circuitry 302, baseband circuitry 304, Radio Frequency (RF) circuitry 306, front-end module (FEM) circuitry 308, one or more antennas 310, and power management circuitry (PMC) 312 coupled together at least as shown. The components of the illustrated device 300 may be included in a UE or a RAN node. In some embodiments, the device 300 may include less elements (e.g., a RAN node may not utilize application circuitry 302, and instead include a processor/controller to process IP data received from an EPC). In some embodiments, the device 300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 302 may include one or more application processors. For example, the application circuitry 302 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 300. In some embodiments, processors of application circuitry 302 may process IP data packets received from an EPC.

The baseband circuitry 304 may include circuitry such as, but not limited to, one or more single-core or multi-core processors. The baseband circuitry 304 may include one or more baseband processors or control logic to process baseband signals received from a receive signal path of the RF circuitry 306 and to generate baseband signals for a transmit signal path of the RF circuitry 306. Baseband processing circuitry 304 may interface with the application circuitry 302 for generation and processing of the baseband signals and for controlling operations of the RF circuitry 306. For example, in some embodiments, the baseband circuitry 304 may include a third generation (3G) baseband processor 304A, a fourth generation (4G) baseband processor 304B, a fifth generation (5G) baseband processor 304C, or other baseband processor(s) 304D for other existing generations, generations in development or to be developed in the future (e.g., second generation (2G), sixth generation (6G), etc.). The baseband circuitry 304 (e.g., one or more of baseband processors 304A-D) may handle various radio control functions that enable communication with one or more radio networks via the RF circuitry 306. In other embodiments, some or all of the functionality of baseband processors 304A-D may be included in modules stored in the memory 304G and executed via a Central Processing Unit (CPU) 304E. The radio control functions may include, but are not limited to, signal modulation/demodulation, encoding/decoding, radio frequency shifting, etc. In some embodiments, modulation/demodulation circuitry of the baseband circuitry 304 may include Fast-Fourier Transform (FFT), precoding, or constellation mapping/demapping functionality. In some embodiments, encoding/decoding circuitry of the baseband circuitry 304 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 304 may include one or more audio digital signal processor(s) (DSP) 304F. The audio DSP(s) 304F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 304 and the application circuitry 302 may be implemented together such as, for example, on a system on a chip (SOC).

In some embodiments, the baseband circuitry 304 may provide for communication compatible with one or more radio technologies. For example, in some embodiments, the baseband circuitry 304 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 304 is configured to support radio communications of more than one wireless protocol may be referred to as multi-mode baseband circuitry.

RF circuitry 306 may enable communication with wireless networks using modulated electromagnetic radiation through a non-solid medium. In various embodiments, the RF circuitry 306 may include switches, filters, amplifiers, etc. to facilitate the communication with the wireless network. RF circuitry 306 may include a receive signal path which may include circuitry to down-convert RF signals received from the FEM circuitry 308 and provide baseband signals to the baseband circuitry 304. RF circuitry 306 may also include a transmit signal path which may include circuitry to up-convert baseband signals provided by the baseband circuitry 304 and provide RF output signals to the FEM circuitry 308 for transmission.

In some embodiments, the receive signal path of the RF circuitry 306 may include mixer circuitry 306a, amplifier circuitry 306b and filter circuitry 306c. In some embodiments, the transmit signal path of the RF circuitry 306 may include filter circuitry 306c and mixer circuitry 306a. RF circuitry 306 may also include synthesizer circuitry 306d for synthesizing a frequency for use by the mixer circuitry 306a of the receive signal path and the transmit signal path. In some embodiments, the mixer circuitry 306a of the receive signal path may be configured to down-convert RF signals received from the FEM circuitry 308 based on the synthesized frequency provided by synthesizer circuitry 306d. The amplifier circuitry 306b may be configured to amplify the down-converted signals and the filter circuitry 306c may be a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may be zero-frequency baseband signals, although this is not a requirement. In some embodiments, mixer circuitry 306a of the receive signal path may comprise passive mixers, although the scope of the embodiments is not limited in this respect.

In some embodiments, the mixer circuitry 306a of the transmit signal path may be configured to up-convert input baseband signals based on the synthesized frequency provided by the synthesizer circuitry 306d to generate RF output signals for the FEM circuitry 308. The baseband signals may be provided by the baseband circuitry 304 and may be filtered by filter circuitry 306c.

In some embodiments, the mixer circuitry 306a of the receive signal path and the mixer circuitry 306a of the transmit signal path may include two or more mixers and may be arranged for quadrature downconversion and upconversion, respectively. In some embodiments, the mixer circuitry 306a of the receive signal path and the mixer circuitry 306a of the transmit signal path may include two or more mixers and may be arranged for image rejection (e.g., Hartley image rejection). In some embodiments, the mixer circuitry 306a of the receive signal path and the mixer circuitry 306a may be arranged for direct downconversion and direct upconversion, respectively. In some embodiments, the mixer circuitry 306a of the receive signal path and the mixer circuitry 306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 304 may include a digital baseband interface to communicate with the RF circuitry 306.

In some dual-mode embodiments, a separate radio IC circuitry may be provided for processing signals for each spectrum, although the scope of the embodiments is not limited in this respect. In some embodiments, the synthesizer circuitry 306d may be a fractional-N synthesizer or a fractional N/N+1 synthesizer, although the scope of the embodiments is not limited in this respect as other types of frequency synthesizers may be suitable. For example, synthesizer circuitry 306d may be a delta-sigma synthesizer, a frequency multiplier, or a synthesizer comprising a phase-locked loop with a frequency divider.

The synthesizer circuitry 306d may be configured to synthesize an output frequency for use by the mixer circuitry 306a of the RF circuitry 306 based on a frequency input and a divider control input. In some embodiments, the synthesizer circuitry 306d may be a fractional N/N+1 synthesizer.

In some embodiments, frequency input may be provided by a voltage-controlled oscillator (VCO), although that is not a requirement. Divider control input may be provided by either the baseband circuitry 304 or the applications processor 302 depending on the desired output frequency. In some embodiments, a divider control input (e.g., N) may be determined from a look-up table based on a channel indicated by the applications processor 302.

Synthesizer circuitry 306d of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 306 may include an IQ/polar converter.

FEM circuitry 308 may include a receive signal path which may include circuitry configured to operate on RF signals received from one or more antennas 310, amplify the received signals and provide the amplified versions of the received signals to the RF circuitry 306 for further processing. FEM circuitry 308 may also include a transmit signal path which may include circuitry configured to amplify signals for transmission provided by the RF circuitry 306 for transmission by one or more of the one or more antennas 310. In various embodiments, the amplification through the transmit or receive signal paths may be done solely in the RF circuitry 306, solely in the FEM 308, or in both the RF circuitry 306 and the FEM 308.

In some embodiments, the FEM circuitry 308 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 306). The transmit signal path of the FEM circuitry 308 may include a power amplifier (PA) to amplify input RF signals (e.g., provided by RF circuitry 306), and one or more filters to generate RF signals for subsequent transmission (e.g., by one or more of the one or more antennas 310).

In some embodiments, the PMC 312 may manage power provided to the baseband circuitry 304. In particular, the PMC 312 may control power-source selection, voltage scaling, battery charging, or DC-to-DC conversion. The PMC 312 may often be included when the device 300 is capable of being powered by a battery, for example, when the device is included in a UE. The PMC 312 may increase the power conversion efficiency while providing desirable implementation size and heat dissipation characteristics.

While FIG. 3 shows the PMC 312 coupled only with the baseband circuitry 304. However, in other embodiments, the PMC 3 12 may be additionally or alternatively coupled with, and perform similar power management operations for, other components such as, but not limited to, application circuitry 302, RF circuitry 306, or FEM 308.

In some embodiments, the PMC 312 may control, or otherwise be part of, various power saving mechanisms of the device 300. For example, if the device 300 is in an RRC_Connected state, where it is still connected to the RAN node as it expects to receive traffic shortly, then it may enter a state known as Discontinuous Reception Mode (DRX) after a period of inactivity. During this state, the device 300 may power down for brief intervals of time and thus save power.

If there is no data traffic activity for an extended period of time, then the device 300 may transition off to an RRC_Idle state, where it disconnects from the network and does not perform operations such as channel quality feedback, handover, etc. The device 300 goes into a very low power state and it performs paging where again it periodically wakes up to listen to the network and then powers down again. The device 300 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 302 and processors of the baseband circuitry 304 may be used to execute elements of one or more instances of a protocol stack. For example, processors of the baseband circuitry 304, alone or in combination, may be used execute Layer 3, Layer 2, or Layer 1 functionality, while processors of the application circuitry 304 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 4:
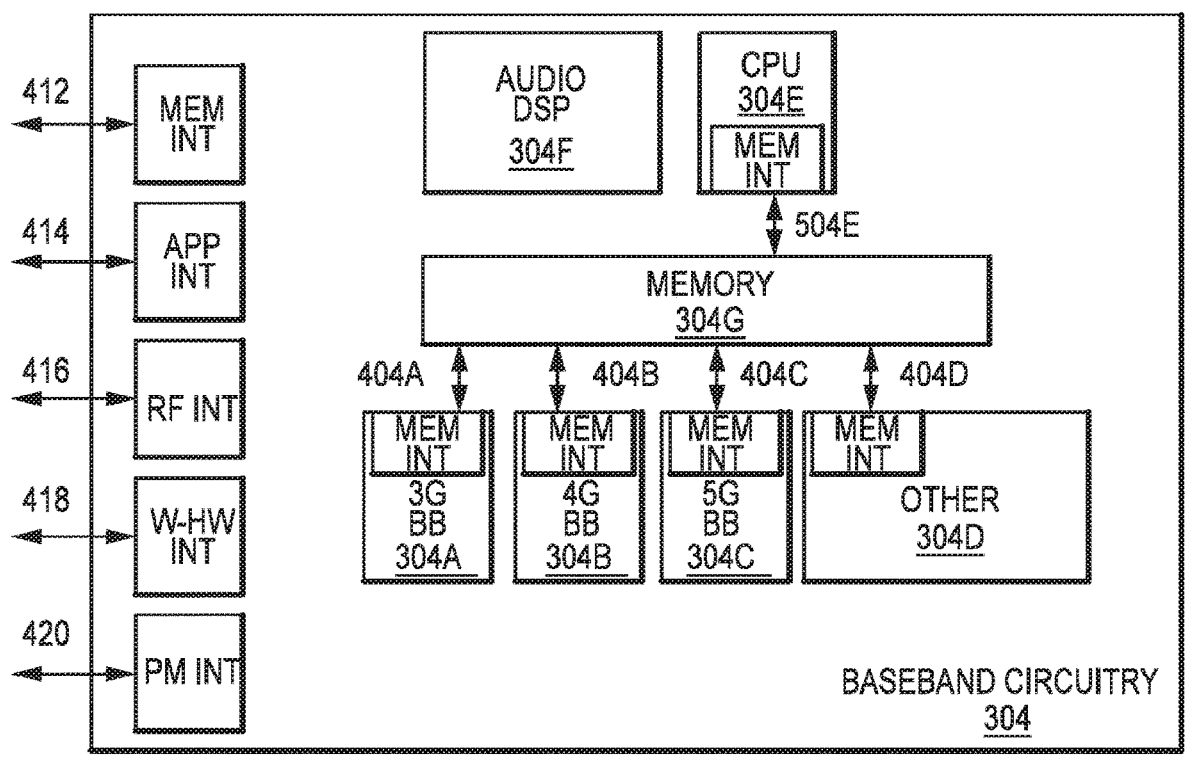
FIG. 4 illustrates example interfaces of baseband circuitry in accordance with some embodiments.

FIG. 4 illustrates example interfaces of baseband circuitry in accordance with some embodiments. As discussed above, the baseband circuitry 304 of FIG. 3 may comprise processors 304A-304E and a memory 304G utilized by said processors. Each of the processors 304A-304E may include a memory interface, 404A-404E, respectively, to send/receive data to/from the memory 304G.

The baseband circuitry 304 may further include one or more interfaces to communicatively couple to other circuitries/devices, such as a memory interface 412 (e.g., an interface to send/receive data to/from memory external to the baseband circuitry 304), an application circuitry interface 414 (e.g., an interface to send/receive data to/from the application circuitry 302 of FIG. 3), an RF circuitry interface 416 (e.g., an interface to send/receive data to/from RF circuitry 306 of FIG. 3), a wireless hardware connectivity interface 418 (e.g., an interface to send/receive data to/from Near Field Communication (NFC) components, Bluetooth® components (e.g., Bluetooth® Low Energy), Wi-Fi® components, and other communication components), and a power management interface 420 (e.g., an interface to send/receive power or control signals to/from the PMC 312.

The following are example implementations of the subject matter described herein. In example one, an apparatus of a user equipment (UE) comprises one or more baseband processors to configure a set of resources for New Radio (NR) vehicle-to-everything (V2X) transmission over sidelink for communication with one or more other UEs, and to allocate the resources for transmitting one or more packets from an NR network to the one or more other UEs via the sidelink, and a memory to store the configuration of resources. In example two, the UE is to select the resources to be configured from a resource pool for NR V2X transmission. In example three, the UE is to select the resources to be configured autonomously from the NR network. In example four, the UE is to select the resources for an exception resource pool when the resource pool for NR V2X transmission is unavailable. In example five, the exception pool is used for handover. In example six, the exception pool is used for radio link failure. In example seven, a first resource pool is used for unicast communication and a second resource pool is used for broadcast communication. In example eight, the first resource pool is common for two or more unicast links. In example nine, the first resource pool is unique to a specific unicast link. In example ten, a first congestion control mechanism is used for unicast communication, and a second congestion control mechanism is used for broadcast communication.

In example eleven, one or more machine readable media have instructions stored thereon that, when executed by an apparatus of a user equipment (UE), result in configuring a set of resources for New Radio (NR) vehicle-to-everything (V2X) transmission over sidelink for communication with one or more other UEs, and allocating the resources for transmitting one or more packets from an NR network to the one or more other UEs via the sidelink. In example twelve, the UE is to select the resources to be configured from a resource pool for NR V2X transmission. In example thirteen, the UE is to select the resources to be configured autonomously from the NR network. In example fourteen, the UE is to select the resources for an exception resource pool when the resource pool for NR V2X transmission is unavailable. In example fifteen, the exception pool is used for handover. In example sixteen, the exception pool is used for radio link failure. In example seventeen, a first resource pool is used for unicast communication and a second resource pool is used for broadcast communication. In example eighteen, the first resource pool is common for two or more unicast links. In example nineteen, the first resource pool is unique to a specific unicast link. In example twenty, a first congestion control mechanism is used for unicast communication, and a second congestion control mechanism is used for broadcast communication.

Although the claimed subject matter has been described with a certain degree of particularity, it should be recognized that elements thereof may be altered by persons skilled in the art without departing from the spirit and/or scope of claimed subject matter. It is believed that the subject matter pertaining to resource allocation and configuration for broadcast and unicast operation over sidelink for New Radio (NR) V2X and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a user equipment (UE), comprising:
one or more baseband processors to configure a set of resources for New Radio (NR) vehicle-to-everything (V2X) transmission over sidelink for communication with one or more other UEs, to allocate the set of resources for transmitting one or more packets from an NR network to the one or more other UEs via the sidelink, to determine whether a resource pool for the NR V2X transmission is unavailable, when the resource pool for the NR V2X transmission is unavailable, select the set of resources from an exception resource pool and when the resource pool for the NR V2X transmission is available, select the set of resources to be configured from the resource pool for the NR V2X transmission, wherein a first resource pool, in the set of resources, is used for unicast communication and a second resource pool, in the set of resources, is used for broadcast communication and wherein the first resource pool is unique to a specific unicast link; and
a memory to store the configured set of resources.

2. The apparatus of claim 1, wherein the UE is to select the set of resources to be configured autonomously from the NR network.

3. The apparatus of claim 1, wherein the exception resource pool is used for handover.

4. The apparatus of claim 1, wherein the exception resource pool is used for radio link failure.

5. The apparatus of claim 1, wherein a first congestion control mechanism is used for the unicast communication, and a second congestion control mechanism is used for the broadcast communication.

6. One or more non-transitory machine readable media having instructions stored thereon that, when executed by an apparatus of a user equipment (UE), result in:
configuring a set of resources for New Radio (NR) vehicle-to-everything (V2X) transmission over sidelink for communication with one or more other UEs;
allocating the set of resources for transmitting one or more packets from an NR network to the one or more other UEs via the sidelink;
determining whether a resource pool for the NR V2X transmission is unavailable;
when the resource pool for the NR V2X transmission is unavailable, selecting the set of resources from an exception resource pool; and
when the resource pool for the NR V2X transmission is available, select the set of resources to be configured from the resource pool for the NR V2X transmission, wherein a first resource pool, in the first resource pool, is used for unicast communication and a second resource pool, in the resource pool, is used for broadcast communication and wherein the first resource pool is unique to a specific unicast link.

7. The one or more non-transitory machine readable media of claim 6, wherein the UE is to select the set of resources to be configured autonomously from the NR network.

8. The one or more non-transitory machine readable media of claim 6, wherein the exception resource pool is used for handover.

9. The one or more non-transitory machine readable media of claim 6, wherein the exception resource pool is used for radio link failure.

10. The one or more non-transitory machine readable media of claim 6, wherein a first congestion control mechanism is used for the unicast communication, and a second congestion control mechanism is used for the broadcast communication.

* * * * *